Oct. 27, 1959 E. J. SCHUTZNER 2,910,646
PORTABLE RATIO TESTER FOR TRANSFORMERS
Filed Nov. 5, 1956 2 Sheets-Sheet 1
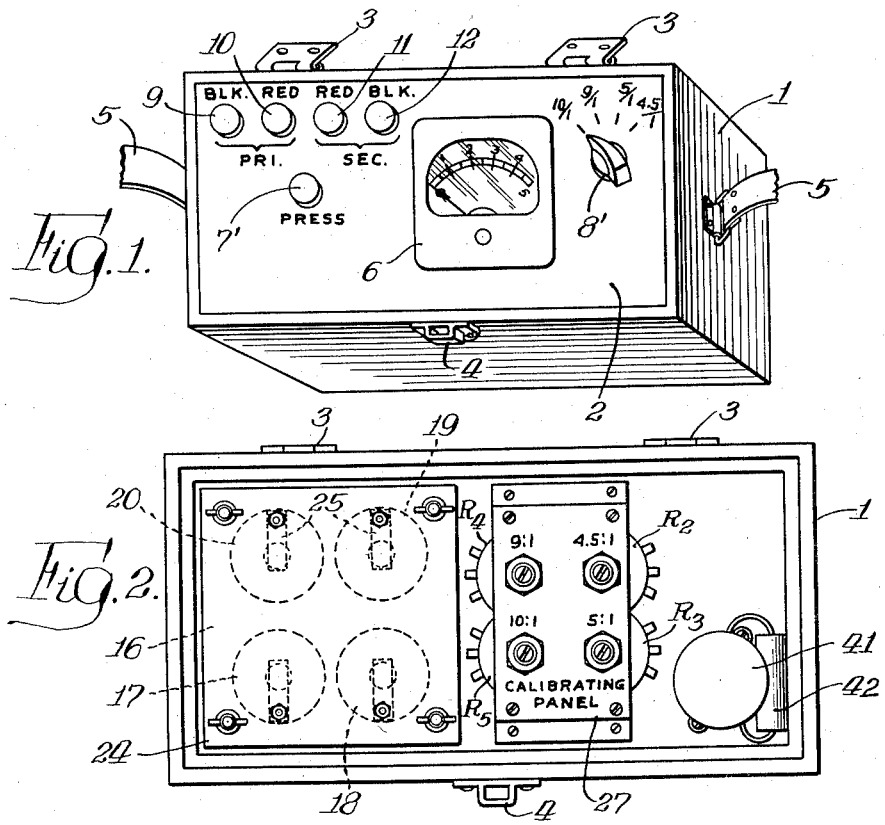
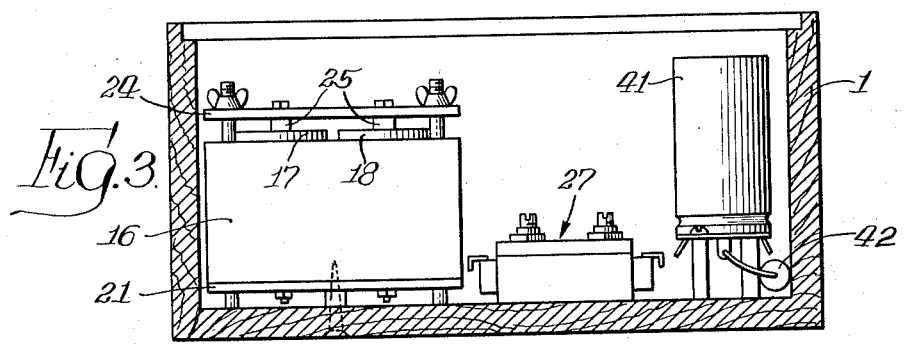
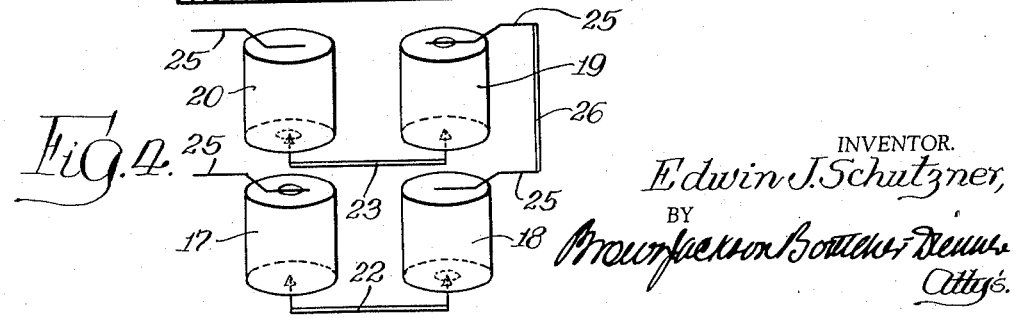
INVENTOR.
Edwin J. Schutzner,
BY
Brown Jackson Boettcher Dienner
Atty's.

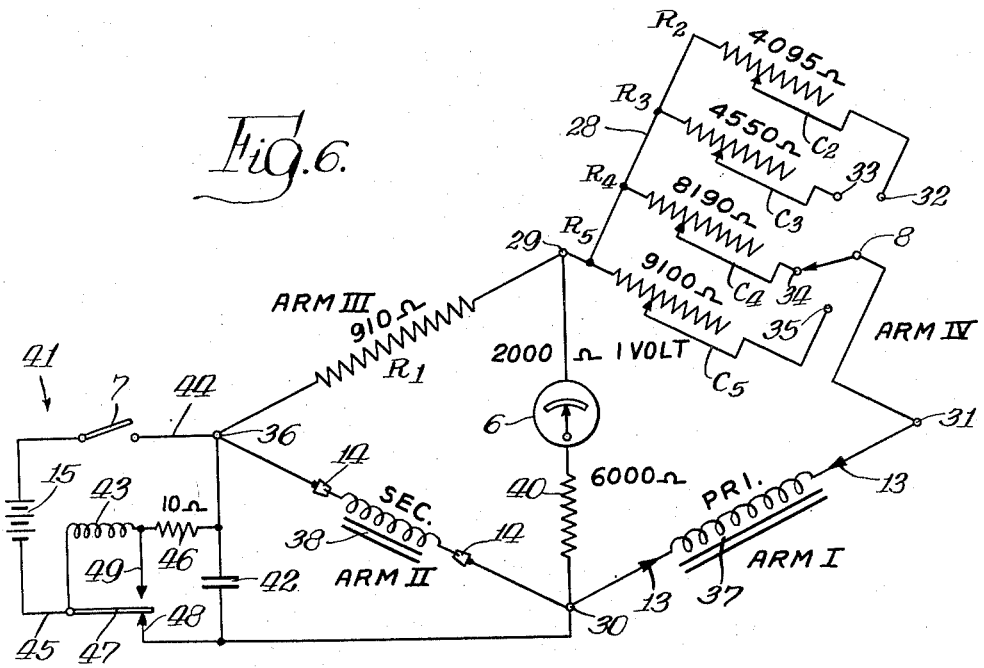

United States Patent Office 2,910,646
Patented Oct. 27, 1959

2,910,646

PORTABLE RATIO TESTER FOR TRANSFORMERS

Edwin J. Schutzner, Chicago, Ill.

Application November 5, 1956, Serial No. 620,479

6 Claims. (Cl. 324—55)

The present invention relates to the art of electrical testing and is particularly concerned with the provision of a device for determining the ratio of windings in power transformers. Transformers furnished to utility companies for distribution purposes may be employed on two different primary circuits in one of which a winding ratio of ten turns in the primary to one in the secondary, and in the other of which a ratio of nine turns of the primary to one turn of the secondary is desired. The transformers may also have windings to produce ratios between primary and secondary voltages of five to one and four and one-half to one. The manufacturer finds it simpler to construct transformers for use with either primary circuit and to provide an internal primary tap changer which will include in one setting the full ten to one ratio, and in another setting the nine to one ratio of one, transformer and four and one-half to one and five to one for the other. Hence, the same transformer is usable on either primary circuit by appropriate adjustment of the primary tap changer and shift of the secondary connections. Since the tap changer is internal of the case, the interests of certainty require the company to determine for itself the ratio for which the windings are actually set. Hence, it becomes necessary to utilize some testing method for determining that the ratio is in accordance with the desired value.

I am aware that testing equipment using, for example, commercial alternating current and two meters has been employed to make this determination, but in my experience, no convenient device for or method of making these tests was available. All such equipment as I know of requires a stationary source of alternating current with extension cords or leads which are always inconvenient and frequently dangerous. I conceived the possibility of constructing a completely portable device operating on the principle of balancing the voltages of the transformer windings against resistances of predetermined values in like proportions, whereby bringing the bridge into balance indicates that the transformer windings are in the proper ratio corresponding to the ratio of the resistances in the corresponding arms of the bridge. For creating the necessary potential in the two circuits, I conceived the possibility of applying pulsations of direct current as by means of an electromagnetic buzzer interrupter or a transistor controlled oscillator unit operated by a low voltage source of direct current, for example, a six volt dry battery which may consist of four flash light cells. Since the current drain is only about 40 milliamperes, four cells of flash light type batteries will serve for a long time. By thus making the pulsating D.C. power supply highly portable, it is possible to take the testing device to the transformer. Leads of only three to four feet running from the binding posts on the portable case to the terminals on the transformer are required. The case is preferably carried in front of the operator on a strap slung around the neck of the operator. The face or panel of the device is exposed upwardly in plain sight, and in convenient position for manipulation of the controls by the operator. The galvanometer for the bridge should be of high sensitivity. I have found that a one volt full deflection 2000 ohms per volt galvanometer with 6000 ohms in series is satisfactory for the service. This provides a substantial deflection for settings of the potentiometer off of the anticipated ratio for testing for the presence of operating potential.

The test leads and the terminals of the device are color coded red and black, red primary and red secondary leads being connected on the same side of the transformer and likewise the black primary and black secondary leads on the other side of the transformer. Since the testing method is a null method, and assuming that the resistances in the two arms of the bridge are correctly set for the ratio of turns of primary and secondary of the transformer, closing the battery switch will not give any observable indication on the galvanometer of operating potential in the circuit. In order to ascertain whether the testing potential is actually present in the testing circuit, the operator may vary the variable resistance in arm IV to throw the bridge out of balance so as to give an indication on the galvanometer that testing potential is present.

The application of the direct current impulses to producing magnetic impulses in the core of the transformer is best done by way of the secondary transformer winding, but any way of producing the magnetic pulsations which create terminal voltages on the individual windings in proportion to the number of turns may be employed. The aforesaid pulsations may be of a frequency in the lower audio range, such as from 60 to 120 cycles per second and higher. The frequency is not critical. I have successfully employed oscillation or buzzer frequencies of 90 cycles per second under no load to 87 cycles per second under load.

The voltages of the two windings primary and secondary are additive in the circuit. This tends to give a better deflection on the galvanometer.

The use of low voltage impulses or oscillations is highly desirable in as much as there is no danger of shock in handling of the equipment. The use of such low voltage, low current flow and low frequency has numerous obvious advantages.

Now in order to acquaint those skilled in the art with the manner of constructing and operating the device according to my invention, I shall describe, in connection with the accompanying drawings, a specific embodiment of the same.

In the drawings:

Figure 1 is an isometric view showing the face of the portable case and the operating parts in front of the operator;

Figure 2 is a top plan view of the case with the top panel and parts carried thereby removed to reveal the battery holder, the adjustable resistances for arm 4 and the vibrator;

Figure 3 is a vertical cross section through the assembly shown in Figure 2;

Figure 4 is a diagram of the battery connections employed;

Figure 5 is a diagrammatic showing of one embodiment of the invention;

Figure 6 is a diagram of another embodiment of the invention corresponding to the particular construction shown in Figures 1 to 4, and constituting the preferred form.

Referring to Figure 1, the instrument comprises a box-like case 1 having a cover plate 2 which forms an instrument board facing upwardly. A cooperating top or lid, not shown, is hinged at the hinges 3, 3, and has a latch cooperating with the latch part 4 shown on the front of the case. The instrument is carried with the latch part 4 towards the body of the operator, and the instrument is suspended by a strap, the ends 5, 5 of which are shown in the drawing, and the bight of which is slung over the operator's shoulders and around the back of the neck, whereby the instrument is carried on the front of the body of the operator in position for him to see the face of the instrument board, and particularly the galvanometer as it appears in Figure 1. The board 2 carries on its face the operating member 7' for operating the switch 7 to close the battery circuit. This switch button may be depressed by the left hand to close the battery circuit while the operator manipulates the connections to the transformer terminals with the right hand. At the upper right hand portion of the panel 2, there is disposed a selector knob 8' for operating a switch 8 for selecting the desired resistance value in arm IV. The resistance value selected will be that suitable for balancing the bridge circuit which this device embodies at one of the predetermined ratios of the turns of the primary and secondary windings of the transformer. For example, the windings may be of the ratio of ten to one or nine to one, or five to one, or four and one-half to one. The knob 8' may operate a potentiometer 8a with resistance values predetermined in the various settings as shown, or the knob 8' may operate a selector switch 8 to select any one of a plurality of fixed but adjustable resistances $R_2$, $R_3$, $R_4$ or $R_5$, as shown, for example, in Figure 6. When the device is brought to a transformer, the ratio of whose windings is to be determined, the switch 8 will preferably be set upon the resistance value the ratio of which to the resistance in arm III will correspond to the anticipated ratio of turns of the transformer windings.

In the upper left hand corner of the panel 2 are provided binding post terminals 9, 10, 11 and 12 adapted to be connected to the primary and to the secondary leads or terminals of the transformer under test. The two binding post terminals 9 and 10 in the upper left hand corner of Figure 1 are colored black and red, respectively, and are adapted to be connected to the primary winding of the transformer under test.

The binding post terminals 11 and 12 are similarly color coded red and black, respectively, and are adapted to be connected to the secondary winding of the transformer under test. The red terminals 10 and 11 of both primary and secondary are adapted to be connected to the same side of the transformer, and the black terminals 9 and 12 are adapted to be connected to the other side of the transformer. In this manner, this connection is predetermined as that which puts the two windings in additive relation, that is, so that their potentials will be additive instead of subtractive.

The connection between the binding posts on the instrument panel 2 and the transformer terminals is made by a set of four flexible insulated leads which are color coded corresponding to the color coding of the terminals 9, 10, 11 and 12. Then to distinguish between primary and secondary terminals at the transformer end of the test leads I provide the primary leads with prods 13, 13 and provide the secondary leads with alligator clips 14, 14. The opposite ends of the test leads may terminate in eyes slipping over the screws of the binding posts or terminals 9, 10, 11 and 12.

The disposition of the operating elements employed in the bridge circuit is illustrated in Figures 2 and 3. At the left side of the case 1 a block-like battery container 16 is provided with four flashlight cells 17, 18, 19 and 20. These cells are connected in series as shown in Figure 4 to constitute the battery 15. The cells are held in cylindrical holes in the wooden block 16. A plate 21 over the bottom of these holes provides connecting bars 22 and 23 upon which the lower ends of the cells rest. A terminal plate 24 at the top carries a series of spring contacts, of which the two at the right in Figure 4 are connected together by the connecting bar 26. The two springs 25 at the left of Figure 4 form the battery terminals of the four cells in series. Alternate cells are inverted in order to provide the series connection.

In the central part of the box there is disposed a calibrating panel 27, carrying four adjustable resistance units corresponding to the resistances $R_2$, $R_3$, $R_4$ and $R_5$, as shown in Figure 6. The resistances $R_2$ and $R_3$ are preferably 5000 ohm Clarostat type resistors with rotating arms, bearing upon the resistance element. The rheostats corresponding to resistances $R_4$ and $R_5$ are similar 10,000 ohm Clarostat type of potentiometer resistances with rotary adjustable arms to constitute an adjustable resistance element to give the desired value indicated on Figures 2 and 6. The adjustable arms of the potentiometer type rheostats are indicated as sliding arms $C_2$, $C_3$, $C_4$ and $C_5$ in Figure 6. In Figure 2, the setting of each of these rheostats is indicated on the calibrating panel. One end of each of the rheostats is connected to a common lead 28, which is connected to the midpoint 29 between arms III and IV of the bridge as shown in Figure 6. The opposite ends of the rheostats are connected to individual contacts 32, 33, 34 and 35, engageable by the arm of the switch 8 to connect any one of the aforesaid resistances in the circuit in arm IV. The switch arm 8 is connected to the end point 31 where arms I and IV are connected together. Arm I contains the primary winding 37 of the transformer under test, and arm II contains a secondary winding 38 of the transformer under test. It is to be remembered that the primary and secondary windings 37 and 38 are wound upon the same transformer core, so that current impulses produced in the magnetic core will link with both the primary and the secondary and generate therein suitable pulsations of potential.

A fixed resistor $R_1$ is connected in arm III of the bridge as shown in Figure 6, and the galvanometer 6 is bridged across the points 29 and 30, that is, the points which will be at equal potential when the bridge is balanced. The instrument 6 is a rectifier volt meter which normally indicates zero potential when not activated, and which has a full scale deflection for maximum potential on the points 29 and 30. The instrument is preferably a 2000 ohms per volt instrument and has a 6000 ohms resistor 40 connected in series therewith to limit current flow and protect the instrument against excessive deflection, and at the same time reducing the shunting effect on the current supply.

The magnetic core of the transformer, which links the primary and secondary windings 37 and 38, is activated through the secondary winding, which is the low voltage winding of the transformer. This is the winding connected in arm II of the bridge. Pulsations of direct current are applied to the magnetic core through the second secondary winding in the preferred embodiment by a vibrator interrupter or buzzer interrupter shown as a unit 41 in Figures 2 and 3 and disposed in the carrying case 1 at the right hand end of the same. A condenser 42 is associated with the vibrator 41 by the connection shown in Figures 5 and 6. The vibrator 41 comprises a winding 43 bridged across the battery leads 44 and 45 in series with a 10 ohm resistance 46. This circuit is normally opened and is closed by the operator depressing the switch 7 by means of the button 7', which is exposed on the face of the instrument panel 2. The buzzer has a movable contact 47 magnetically attracted by energization of the winding 43, and automatically dropped when the winding 43 is de-energized. The said movable contact 47 cooperates with a back contact 48, which is in turn connected to the point 30 on the bridge, and it has a front contact 49 engaged by the moving contact 47 when the winding 43 is energized, this front contact being connected at the point between said winding 43 and the resistance 46 to be engaged by the movable contact 47 to short-circuit the winding 43 and produce return of the moving contact 47 to the back contact 48 for producing a maximum height of voltage impulse upon the transformer winding 38 to supply the desired direct current impulses in the circuit.

The condenser 42 is bridged across the output terminals of the vibrator 41, and hence also bridged across the terminals of the secondary winding 38 of the transformer.

Initially, the bridge resistances, are calibrated on the ratio of the transformer windings, that is to say, resistance $R_1$ in arm III of the bridge has a value of one as compared to a value of ten in arm IV when the ratio of the secondary winding to the primary winding is as one to ten. For example, in Figure 6, the fixed resistance $R_1$ in arm III is set at 910 ohms. Then the two 5000 ohm rheostats are set to include 4095 ohms in the arm carrying resistance $R_2$ and 4550 ohms in the arm corresponding to resistance $R_3$. The two 10,000 ohm rheostats are set at 8190 ohms for resistance $R_4$ and 9100 ohms for resistance $R_5$.

As shown in Figure 6, the ratio of the resistance in arm III to arm IV is one to nine. The transformer winding ratio which is anticipated on the test is therefore one turn on the secondary for nine turns on the primary. For a ratio of one to ten, the switch 8 will be set to include the resistance $R_5$, namely, 9100 ohms, which is ten times the resistance of the fixed resistor $R_1$, the value of which is 910 ohms. Similarly, where the ratio is anticipated as one to five, the switch 8 will be set to include the resistor $R_3$, and when the anticipated ratio of windings is one to four and one-half, the switch 8 will be set to include resistor $R_2$.

Instead of having a series of rheostats adjusted to desired values, a single potentiometer type rheostat, as shown at 8a in Figure 5 in arm IV may consist of a 25,000 ohm resistance element having a swinging contact arm 50 which may be set in predetermined positions. For example, where a one to nine transformer winding ratio is anticipated, the arm III may contain a fixed resistance of 1000 ohms, and the adjustable resistance may be set at a value to include 9,000 ohms in arm IV.

The operation of the device is simple. The test leads from the binding posts 9, 10, 11 and 12 are connected to the primary and to the secondary terminals of the transformer by means of prods and alligator clips or other suitable connecting means which may be provided. With the connections thus made, the circuit will be as shown in Figure 5 or Figure 6. Thereupon, by pressing the switch 7 to closed position, the vibrator 41 is energized and, due to the connections previously described, impulses of direct current will flow through the secondary winding and energize the core of the transformer, creating a voltage in the primary winding proportional to the voltage in the secondary winding. Now assuming that the resistance in arm IV has been set at a value to correspond to the winding ratio, depressing the switch 7 to closed position, no significant indication is given by the meter 6. That is because the test is a nul test. In order to be certain that the potential is being appropriately applied, the switch arm 8 in Figure 6 will be swung through the four positions, and it will be observed that in three of these positions, the potential will be indicated on the instrument 6, whereas on the fourth position, which connects the correct ratio of resistance, the meter will give zero indication, thereby assuring the operator that the ratio of windings is in proportion to the ratio of resistances selected.

If when the switch 7 is depressed, and the switch arm 8 in Figure 6 or the switch arm 50 in Figure 5 is moved over its various positions, without any response on the meter, it is an indication that either the battery is dead or that a fault has developed within the instrument. The operator can generally detect audibly the buzzing of the vibrator, and hence may be certain that the battery is not dead. A zero indication on meter 6 under the circumstances that the resistance in arm IV is shifted, and no indication given on the meter 6 informs the operator that the connections are not properly made.

Instead of the magnetic buzzer interrupter 41 an oscillator controlled by one or more transistors may be employed. A Colpitts oscillator connection utilizing a tuned or resonant circuit to provide feedback to an NPN transistor may be employed as a source of electrical impulses for the purposes of the bridge circuit instead of the vibrator interrupter illustrated in the drawings.

When the operator is testing a number of transformers, the ratio switch 8 in Figure 6, or 50 in Figure 5, should periodically be shifted from its proper testing position in order to obtain an indication on the meter 6 that there is an application of voltage to the system. This indicates that the device is in proper operating condition.

I do not intend to be limited to the precise details shown and described, but intend the appended claims to be interpreted with due regard to the doctrine of equivalents which the law provides.

I claim:

1. In a portable device of the class described, a carrying case containing a low voltage source of pulsating current comprising a dry battery and a magnetic buzzer interrupter, a circuit including a push button switch for closing the connection from the battery to the interrupter, primary lead terminals carried by said case for connection to the primary leads of a transformer to be tested, secondary lead terminals also carried by said case for connection to the secondary leads of said transformer, a four arm bridge circuit contained in said case, said circuit comprising a jumper connection between a primary lead terminal and a secondary lead terminal to connect said primary of the transformer in arm one of said bridge circuit, and the secondary winding of the transformer in arm two of said bridge circuit, a fixed resistance of a value substantially corresponding to the number of turns in the secondary transformer winding connected in arm three of said bridge circuit, an adjustable but normally fixed resistance corresponding to the number of turns in the primary transformer winding connected in arm four of said bridge circuit, a galvanometer connected from a point on the connection between arms three and four to a point on the connection between arms one and two for indicating potential difference between said points, said magnetic buzzer interrupter being connected to said terminals for the secondary transformer winding to impose on said winding pulsations of unidirectional potential from said dry battery, the resistances in arms three and four being normally adjusted in the ratio of resistance corresponding to the anticipated ratio of the transformer windings under test to bring the bridge into balance whereupon the galvanometer reads zero.

2. The combination of claim 1 with a switch in bridge arm four for varying the ratio of resistances for different transformer winding ratios, said switch being operable to cause the galvanometer to give an indication that testing potential is present in the circuit.

3. The combination of claim 1 wherein the fourth bridge arm comprises a plurality of adjustable but normally fixed resistances for testing transformers of different winding ratios and a selector switch for selecting a resistance corresponding to an anticipated ratio of the transformer to be tested, said selector switch being operable to select a ratio of resistance which will impose a potential upon the galvanometer to indicate that testing potential is present in the circuit.

4. In a portable ratio testing device, a carrying case containing a low voltage source of pulsating direct current comprising a battery, an electromagnetic interrupter and a control switch in series with the battery, said interrupter having output terminals, a condenser connected across said output terminals, said interrupter having a vibratory reed connected to one side of said battery and front and back contacts connected to said output terminals, a control resistance connected in series with said battery and said front contact, a four arm bridge circuit in said case, said bridge circuit including a galvanometer of high sensitivity connected across the bridge for indicating balance of the bridge at zero reading, said bridge circuit including in arm one terminals for the primary winding of the transformer under test, in arm two terminals for the secondary winding of the said transformer, in arm three a fixed resistance, and in arm four a variable resistance with an adjusting means set at a predetermined value of resistance, the ratio of resistances of arm three and arm four being predetermined at the same value as the anticipated ratio of the transformer windings to be connected in arm two and arm one, respectively, the galvanometer being connected between arms one and two and between arms three and four, means for impressing the pulsations of direct current upon the terminals in arm two for the secondary winding of the transformer, and a face plate for said case, said switch, bridge circuit terminals, galvanometer and adjusting means being mounted on said face plate.

5. The combination of claim 4 wherein said bridge terminals for connection to the windings of the transformer are color coded relative to the transformer terminals and short flexible leads for connecting said bridge terminals to said transformer terminals, said flexible leads being similarly color coded.

6. In a portable transformer winding ratio testing device, a carrying case, a source of low voltage pulsations comprising a circuit containing a light weight, low voltage dry battery, a switch, and means for producing voltage pulsations in said battery circuit when the switch is closed, a four arm bridge circuit having resistances in arms three and four in the same ratio as the anticipated ratio of the transformer windings to be connected, both of said circuits being contained in said carrying case, binding post terminals on said case for connecting the secondary winding of the transformer into arm two of the bridge circuit, binding post terminals on said case for connecting the primary winding of the transformer into arm one of the bridge circuit, a galvanometer bridged across the bridge circuit from a point between arms one and two to a point between arms three and four, and means for applying the voltage pulsations of said first circuit upon the terminals in arm two for the transformer secondary winding whereby when the transformer windings are properly connected in the bridge circuit the voltage applied across the bridge circuit will be the sum of the applied voltage plus the voltage induced in the transformer primary winding.

References Cited in the file of this patent
UNITED STATES PATENTS

| | | |
|---|---|---|
| 2,213,848 | Paulson | Sept. 3, 1940 |
| 2,527,568 | Murray | Oct. 31, 1950 |
| 2,657,356 | Mulavey | Oct. 27, 1953 |